Dec. 24, 1963   A. C. CHRISTENSEN, SR., ETAL   3,115,279
APPARATUS FOR CONVEYING MATERIALS
Filed March 26, 1962   2 Sheets-Sheet 2

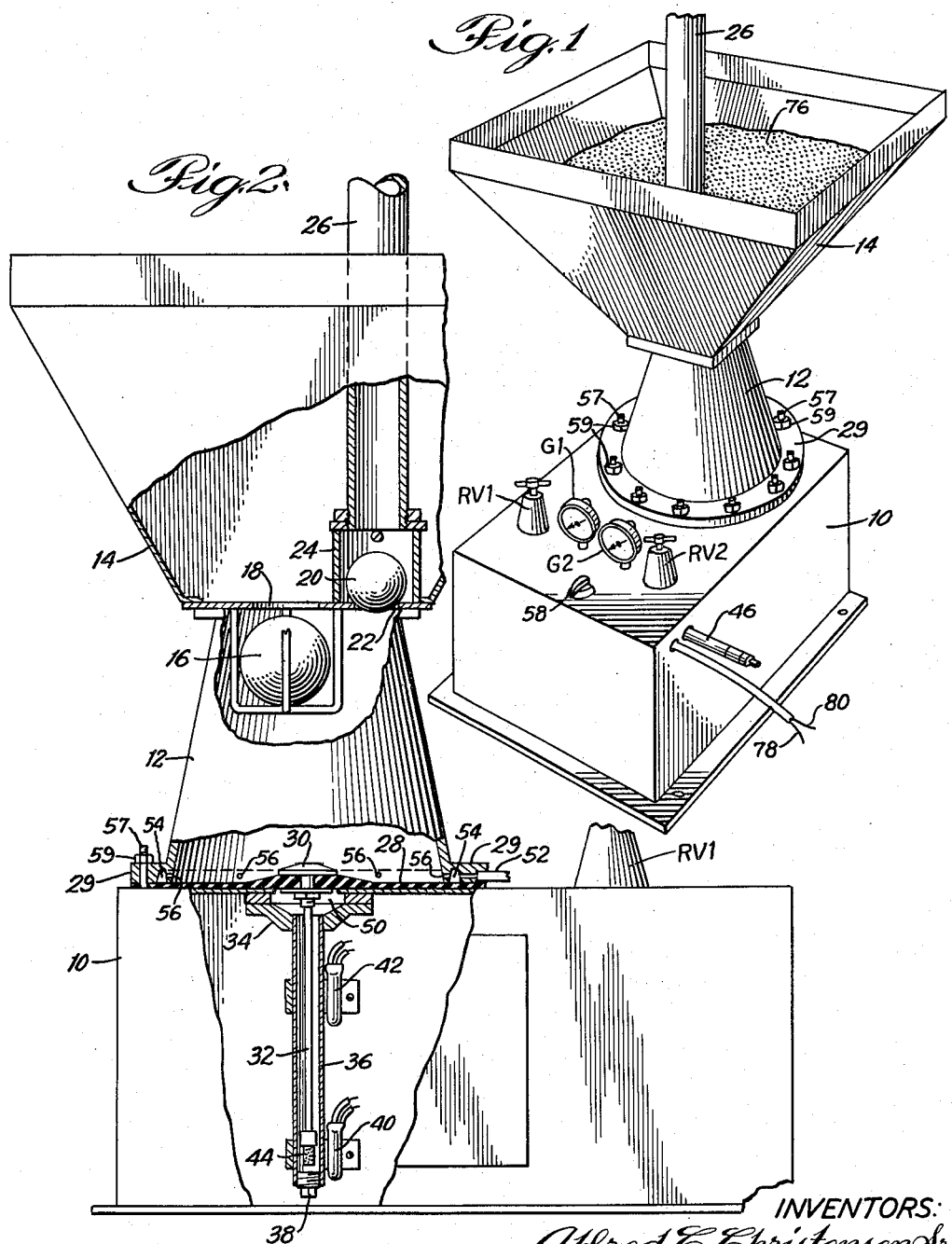

INVENTORS:
Alfred C. Christensen Sr.
and Alfred C. Christensen Jr.,
BY Bair, Freeman & Molinare
ATTORNEYS.

3,115,279
Patented Dec. 24, 1963

3,115,279
APPARATUS FOR CONVEYING MATERIALS
Alfred C. Christensen, Sr., 9204 S. Marshfield Ave., Chicago, Ill., and Alfred C. Christensen, Jr., 5 Oak Lane, Park Forest, Ill.
Filed Mar. 26, 1962, Ser. No. 182,530
7 Claims. (Cl. 222—61)

This invention relates to a method and apparatus for conveying granular and/or powdered material in which compressed air is utilized to effect the movement of the material, the present application being a continuation-in-part of our copending application, Serial No. 842,763, filed September 28, 1959, now Patent No. 3,045,298.

One object of the invention is to provide a comparatively simple and inexpensive apparatus operated by compressed air into which the material to be conveyed is introduced and from the material is conveyed through a pipe to a distant point.

Another object is to provide a method similar to that employed in our copending application above referred to for the conveying of material, which method is exceptionally economical in the ratio of air used to material conveyed, and the conveying velocity is relatively low.

Still another object is to provide an air operated apparatus similar to that shown in our copending application but for conveying granular and the like materials, which apparatus comprises a chamber in which the material may be "fluidized" by the introduction of a small quantity of compressed air, after which means moves into the chamber for displacing the material therefrom through a conduit or the like to a desired point of deposit.

A further object is to provide check valve means associated with the chamber for permitting movement of material thereinto from a hopper or the like, and movement out of the chamber only through the conveying conduit.

Still a further object is to provide means for alternately permitting the reception of material to, and the displacement of material from the chamber through the conduit.

An additional object is to provide automatically operable means in response to movement of the displacing means for cycling the device.

Another additional object is to provide a chamber having a diaphragm spanning its lower end, means to introduce fluidizing air into the chamber adjacent the diaphragm to fluidize the material, and separately to introduce air back of the diaphragm for displacing the material along a conveyor pipe by moving the diaphragm into the chamber.

With these and other objects in view our invention consists in the construction, arrangement and combination of the various parts of our apparatus for conveying material, and in the method disclosed whereby the objects above contemplated are attained as hereinafter more fully set forth, pointed out in our claims and illustrated in detail on the accompanying drawings, wherein:

FIG. 1 is a perspective view of an air operated conveyor device used in our system;

FIG. 2 is a vertical sectional view thereof;

Figure 3:
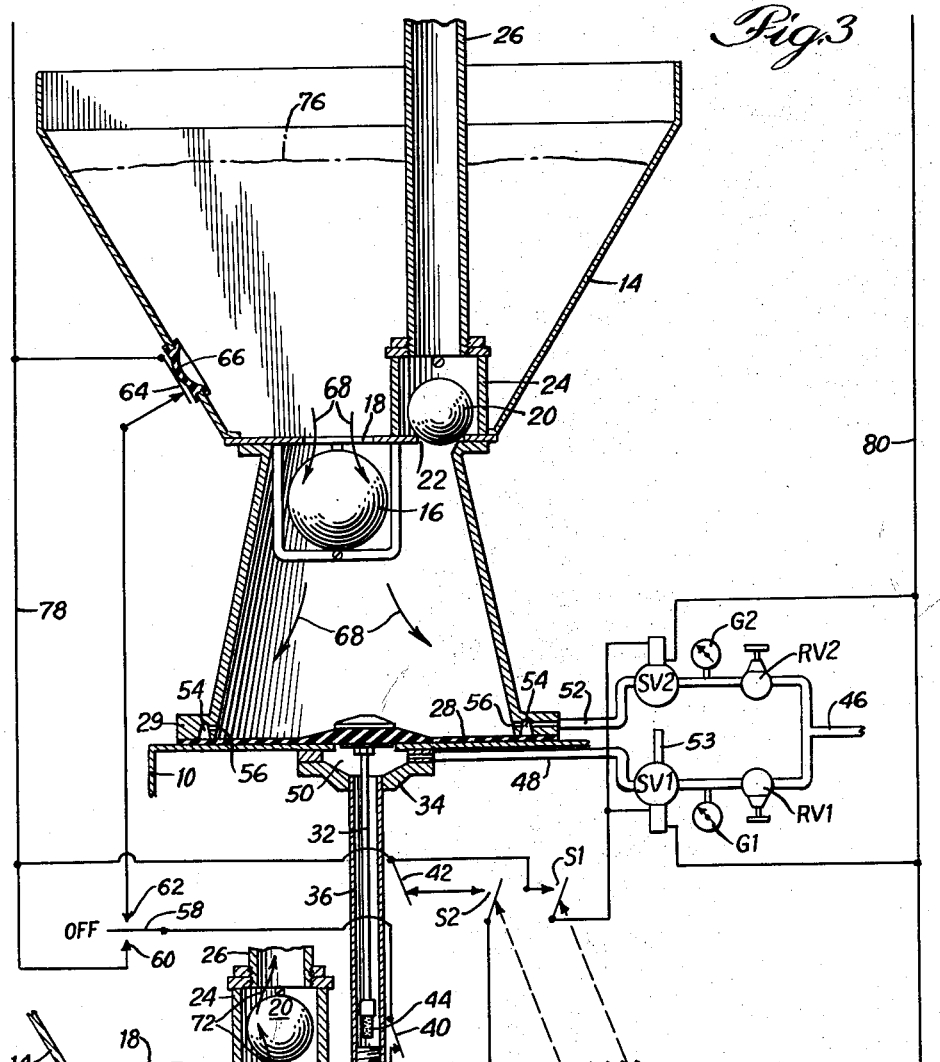
FIG. 3 is a diagrammatic view showing the parts in one position and an electric circuit used for automatically controlling a pair of solenoids for the fluidizing and diaphragm operating air valves.

On the accompanying drawings we have used the reference numeral 10 to indicate a base housing on which is mounted a chamber 12. Extending upwardly from the chamber 12 is a hopper 14 for receiving the material to be conveyed.

Referring to FIG. 2 an inlet check valve 16 is shown which in its uppermost position closes an opening 18. There is also shown an outlet check valve 20 seated on an opening 22. A housing 24 is provided for the outlet check valve 20 and communicates with a conveyor pipe 26 which may extend vertically and/or horizontally to any desired position where the material is to be deposited.

A diaphragm 28 has its periphery interposed between a flange 29 around the lower end of the chamber 12 and the upper surface of the base housing 10 and at its center is provided with a diaphragm fitting 30 from which a control rod 32 depends. A flange 34 is sealed to the top wall of the base housing 10, and the upper end of the depending tube 36 is sealed thereto, and sealed off from atmosphere at its lower end by a plug 38. A lower limit switch 40 of normally open type is clamped to the tube 36 and an upper limit switch 42 of normally closed type is clamped to the tube 36 above the limit switch 40. The clamps permit vertical adjustment of the limit switches in relation to the tube 36 and in relation to each other. These limit switches are preferably of the mercury type and provided with armatures adapted to be attracted by a magnet 44 on the lower end of the control rod 32 for a purpose which will hereinafter appear.

Referring to FIG. 3 a compressed air supply pipe 46 is shown which supplies air to a pair of reducing valves RV1 and RV2. The air from these valves passes through solenoid valves SV1 and SV2 when they are open by energization of their solenoids and is discharged through pipes 48 and 52 respectively equipped with pressure gauges G1 and G2.

The valve SV1 is provided with a vent 53 to atmosphere which is opened when the solenoid of the valve is de-energized thus permitting venting of air from under the diaphragm 28 and from the diaphragm chamber 50 to permit ready inflow of material as illustrated by the arrows 68. The pipe 48 communicates with a diaphragm chamber 50 (see FIG. 4) formed between the upper wall of the base housing 10 and the diaphragm 28 while the pipe 52 communicates with a manifold groove 54 formed in the lower surface of the flange 29 and sealed by the diaphragm 28 by a series of studs 57 welded to the upper surface of the base housing 10 and nuts 59 screwed thereon. Three or four small fluidizing parts 56 communicate the interior of the chamber 12 adjacent the diaphragm 28 with the manifold groove 54 and the pipe 52 for fluidizing purposes with respect to the material to be conveyed as will hereinafter appear.

Referring to FIG. 3 and particularly the wiring diagram thereof, a selector switch 58 is shown for positioning in an "Off" position as shown or in contact with either of two contacts 60 and 62. The contact 60 effects continuous operation of the conveyor device while the contact 62 effects continuous operation thereof only as long as there is sufficient material in the hopper 14 to actuate a material sensing diaphragm 66 and thereby close a material switch 64.

The limit switch 40 is adapted when closed to energize a relay R which in turn closes relay switches S1 and S2. The switch S1 when closed effects energization of the solenoids of the valves SV1 and SV2, and the switch S2 when closed acts as a holding switch for the relay coil R, which holding circuit may be subsequently broken by opening of the limit switch 42 as caused by movement of the magnet 44 to the position shown in FIG. 4.

*Practical Operation*

In the operation of our apparatus, assuming the parts to be in the position shown in FIG. 3, the device is inactive because the selector switch 58 is in the off position. Assuming the hopper 14 filled with material to the level 76 shown, the material will flow past the inlet check valve 16 as indicated by the arrows 68 and fill the chamber 12. The selector switch 58 may be closed against either of the contacts 60 or 62 and will effect energization of the relay R from current supply wire 78 to return wire 80 inasmuch as the normally open lower limit switch 40 at this time is closed by reason of the magnet 44 attracting the armature thereof.

Figure 4:
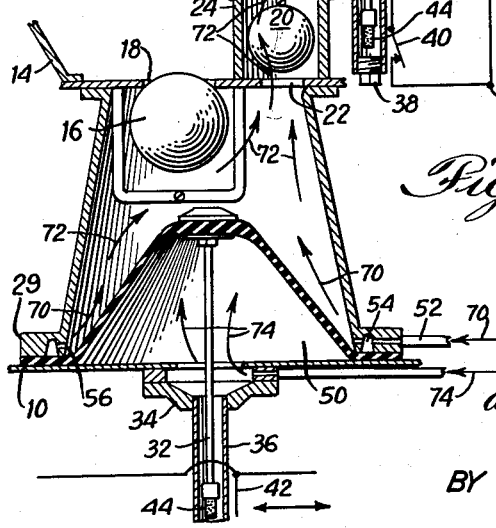
FIG. 4 is a diagrammatic view somewhat similar to a portion of FIG. 3 showing the parts in a different position.

Closure of the switch S1 will energize the solenoid valves SV1 and SV2 so that as shown in FIG. 4 fluidizing air will be introduced as indicated by arrows 70, and diaphragm moving air will be introduced as indicated by arrows 74. Switch S2 will also be closed to establish a holding circuit for the relay coil R after the magnet 44 is moved upwardly from the vicinity of the lower limit switch 40 and permits it to open. Most of the material in the chamber 12 will now be displaced as indicated by the arrows 72, the check valve 16 closing as shown and the check valve 20 opening to permit the material to flow out of the chamber and through the conveyor pipe 26.

When the magnet 44 reaches the vicinity of the upper limit switch 42, it will open this switch, thus deenergizing the holding circuit for the relay coil R, and the relay will drop out to de-energize the solenoid valves SV1 and SV2. Thereupon the weight of the material in the hopper 14 will open the check valve 16 as in FIG. 3 and flow downwardly by gravity into the chamber 12, lowering the diaphragm 28 as it does so and displacing the air from under the diaphragm through the vent 53 of the solenoid valve SV1. The weight of the material in the pipe 26 above the check valve 20 will close it so that this material will not flow back into the chamber. When the magnet 44 again reaches the vicinity of the lower limit switch 40 it will close the relay circuit and the cycle will thereupon be repeated.

If the selector switch 58 is closed on the contact 60 the device will operate continuously until such time as the selector switch is again moved to the off position. If the selector switch is closed on the contact 62, the operation of the device will continue as long as there is material in the hopper 14 sufficient to act on the diaphragm 66 and close the switch 64. When the material is depleted, however, the device will automatically stop because of opening of the switch 64 which de-energizes the relay circuit, but will automatically restart when additional material is available in the hopper 14 to be conveyed.

The apparatus above described for accomplishing the conveying operation we have found to be very economical in air consumption and efficiently operable at much less velocity of the material than in conventional air conveyors wherein approximately 130 cubic feet of free air is required for conveying 1 cubic foot of material. In our device however only 6 cubic feet of free air is required for conveying 1 cubic foot of material, the conveying time being substantially the same. At the same time the velocity required in the conventional air conveyor is 5,000–6,000 f.p.m. whereas in ours 100 f.p.m. is the average. The difference in air consumption is a result of "fluidizing" the material which has a tendency to pack in the chamber 12 because of gravity action thereon. The fluidizing air entering as indicated at 70 in FIG. 4 need be only a very small quantity and at a relatively low pressure. This air trickles through the material and loosens it so that it is rendered readily flowable whereupon the diaphragm 28 when moved upwardly into the chamber 12 as shown in FIG. 4 readily displaces a charge of material therefrom and conveys it through the pipe 26. The charge of air for displacing the diaphragm is relatively small and at a ratio of substantially 1:1 relative to the volume of the material.

Our apparatus is suitable for the conveying of all types of dry material whether granulated or powdered, and the relatively low velocity required for conveying eliminates many of the problems having to do particularly with dust and disposal of the air required for conveying. In our method only the fluidizing air has to be disposed of and the quantity is so small that it is insignificant, whereas in the conventional air conveyor all of the air used for conveying has to be disposed of at the point of final deposit. In our method, on the other hand, the charges of air that actuate the diaphragm 28 are discharged to atmosphere through the vent 53 of the solenoid valve SV2 without ever coming into contact with the conveyed material which operates to minimize dust. Our device also handles coated materials without objectionable separation.

From the foregoing specification it will be obvious that we have provided a comparatively simple apparatus for conveying granular or like materials, and a method of conveying the materials in charges, the apparatus being designed for automatic cycling. Some changes may be made in the construction and arrangement of the parts of our apparatus, and the method steps may be varied to some extent, without departing from the real spirit and purpose of our invention. Accordingly it is our intention to cover by our claims any modified forms of structure, or use of mechanical equivalence or equivalent method steps which may reasonably be included within their scope.

We claim as our invention:

1. Apparatus for conveying granular material comprising a chamber having a top opening adapted to receive the material by gravity flow, an inlet check valve at said top opening, a conveyor pipe leading from said chamber adjacent the top thereof, an outlet check valve associated therewith, a diaphragm closing the bottom of said chamber, means for discharging air into said chamber to fluidize the material therein, means to supply air under said diaphragm to move it upwardly into said chamber to displace the material therefrom, thereby causing it to close said inlet check valve, open said outlet check valve and flow through said conveyor pipe, and means to exhaust air from under said diaphragm to permit the material above said top opening to open said inlet check valve and act on said diaphragm to move it downwardly and the material in said conveyor pipe to close said outlet valve.

2. Apparatus for conveying granular material comprising a truncated cone-shaped chamber adapted to receive the material, an inlet check valve at the top wall of said chamber, a conveyor pipe leading from said top wall, an outlet check valve associated therewith, a diaphragm across the bottom of said cone-shaped chamber and closing said bottom, said diaphragm being movable to assume a cone shape within said truncated cone-shaped chamber, means for discharging air into said chamber adjacent the peripheral edge thereof to fluidize the material therein, and means to move said diaphragm upwardly into said chamber to displace the material therefrom through said conveyor pipe.

3. Apparatus for conveying granular or like material comprising a chamber adapted to receive the material by gravity, an inlet check valve at the entry to said chamber adjacent the top thereof, a conveyor pipe leading from adjacent the top of said chamber, an outlet check valve associated therewith, a diaphragm closing the bottom of said chamber, means for discharging air sufficient only to fluidize the material into said chamber adjacent the peripheral edge of said diaphragm, said diaphragm, upon moving upwardly into said chamber displacing the material and thereby causing it to close said inlet check valve, open said outlet check valve, and flow through said conveyor pipe to a remote point, means automatically responsive to said diaphragm in the lower position thereof to introduce both said fluidizing air and air beneath said diaphragm to move it upwardly, and responsive to an upper position of said diaphragm to stop the flow of fluidizing air and permit exhaust of air from below said diaphragm by downward movement of the diaphragm caused by flow of the material through said inlet check valve and into said chamber, the material in said conveyor pipe at that time closing said outlet valve, and means responsive to the presence of material above said inlet valve to render said last automatically responsive means operative.

4. Apparatus for the continuous conveying of granular or like material comprising a chamber adapted to receive the material by gravity, an inlet check valve at the entry to said chamber adjacent the top thereof, a conveyor pipe leading from said chamber, an outlet check valve associated therewith, a diaphragm closing the bottom of said chamber, means for discharging air sufficient only to fluidize the material into said chamber, said diaphragm, upon moving upwardly into said chamber displacing the material and thereby causing it to close said inlet check valve, open said outlet check valve and flow through said conveyor pipe to a remote point, and means automatically responsive to said diaphragm in the lower position thereof to introduce both said fluidizing air and air to operate said diaphragm, and responsive to an upper position of said diaphragm to stop the flow of fluidizing air and permit air to exhaust from below said diaphragm by downward movement thereof as a result of gravity flow of the material through said inlet check valve and into said chamber.

5. Apparatus for continuously conveying granular material comprising a hopper, a chamber below said hopper and adapted to receive the material therefrom by gravity, a conveyor pipe leading from said chamber, a diaphragm closing the bottom of said chamber, means for discharging air sufficient only to fluidize the material into said chamber, said diaphragm upon moving upwardly into said chamber displacing the material through said conveyor pipe, and means automatically responsive to said diaphragm in the lower position thereof to introduce said fluidizing air, and air to operate said diaphragm, and responsive to an upper position of said diaphragm to stop the flow of fluidizing air and permit exhaust of air from below said diaphragm upon downward movement of said diaphragm by the flow of material by gravity from said hopper and into said chamber to depress said diaphragm.

6. Apparatus for conveying granular or like material comprising a chamber adapted to receive the material, an inlet check valve at the entry to said chamber, a conveyor pipe leading from said chamber, an outlet check valve associated therewith, a diaphragm closing the bottom of said chamber, solenoid valve means for discharging air sufficient only to fluidize the material into said chamber adjacent the peripheral edge of said diaphragm and to discharge air beneath said diaphragm to move it upwardly into said chamber, a limit switch responsive to a lower position of said diaphragm, a relay energized by said limit switch, a switch closed by said relay and operable to energize said solenoid valve means, a holding switch also closed by energization of said relay and, when closed, establishing a holding circuit for said relay, and a second limit switch for breaking said holding circuit when said diaphragm reaches an upper position.

7. Apparatus for conveying granular material comprising a chamber having a top entry adapted to receive the material, an inlet check valve at said entry, a conveyor pipe leading from said chamber adjacent the top thereof, an outlet check valve associated therewith, a diaphragm closing the bottom of said chamber, means for discharging air sufficient only to fluidize the material into said chamber, said diaphragm, upon being moved upwardly into said chamber, displacing the material and thereby causing it to close said inlet check valve, open said outlet check valve and flow through said conveyor pipe, means to permit said diaphragm to be moved downwardly by the flow of material through said inlet check valve into said chamber whereupon the material in said conveyor pipe closes said outlet check valve, said upward and downward movements of said diaphragm constituting a cycle of operation, and means to automatically recycle said fluidizing air discharge means and said diaphragm moving means whereby said material is conveyed through said conveyor pipe in successive charges.

References Cited in the file of this patent

UNITED STATES PATENTS

| | | |
|---|---|---|
| 1,067,613 | Lane | July 15, 1913 |
| 1,892,790 | Smelser | Jan. 3, 1933 |
| 2,324,727 | Shartle | July 20, 1943 |
| 2,457,387 | Locker | Dec. 28, 1948 |
| 2,462,571 | Thompson et al. | Feb. 22, 1949 |
| 2,667,280 | Lane et al. | Jan. 26, 1954 |
| 2,703,055 | Veth et al. | Mar. 1, 1955 |
| 2,881,959 | Bitzer | Apr. 14, 1959 |
| 3,001,652 | Schroeder et al. | Sept. 26, 1961 |